May 19, 1970 KIYOSHI INOUE 3,512,384
SHAPING APPARATUS USING ELECTRIC-DISCHARGE PRESSURE
Filed Nov. 18, 1965 2 Sheets-Sheet 1

KIYOSHI INOUE
INVENTOR

BY Karl G. Ross
Attorney

May 19, 1970            KIYOSHI INOUE            3,512,384
SHAPING APPARATUS USING ELECTRIC-DISCHARGE PRESSURE
Filed Nov. 18, 1965                              2 Sheets-Sheet 2
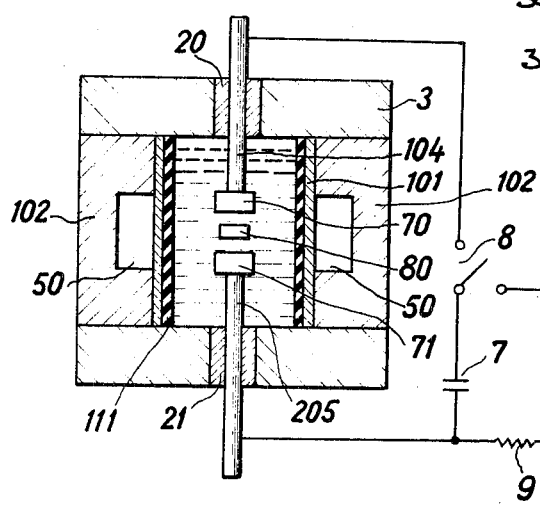
FIG. 5
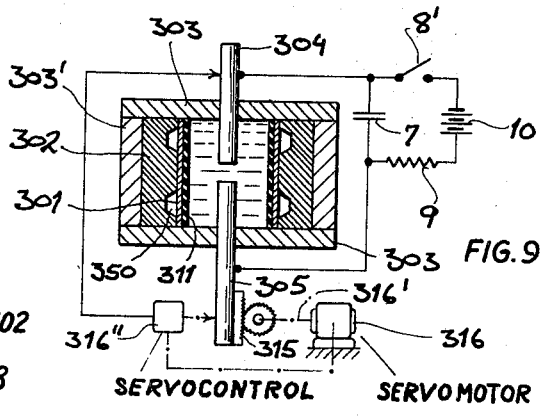
FIG. 9
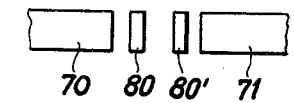
FIG. 6
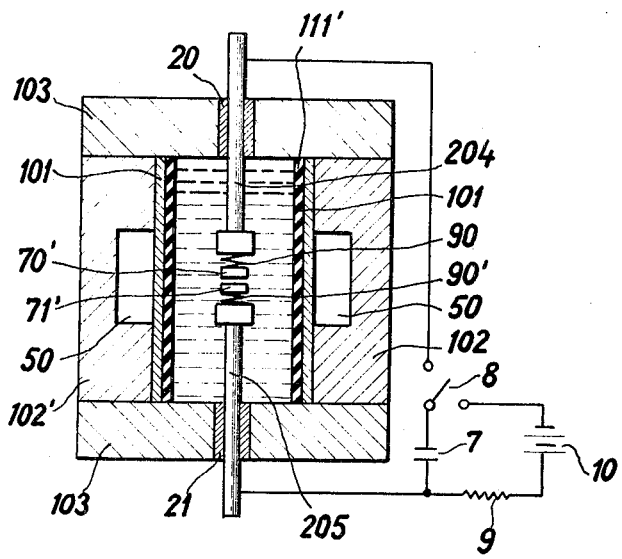
FIG. 7
FIG. 8
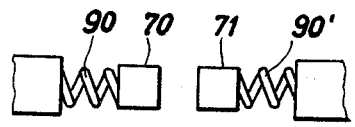
KIYOSHI INOUE
INVENTOR.
BY Karl J. Foss
Attorney 3,512,384
SHAPING APPARATUS USING ELECTRIC-
DISCHARGE PRESSURE
Kiyoshi Inoue, 182 3-chome, Tamagawayoga-machi,
Sitagaya-ku, Tokyo, Japan
Continuation-in-part of application Ser. No. 41,080,
July 6, 1960. This application Nov. 18, 1965, Ser.
No. 508,487
Claims priority, application Japan, Aug. 31, 1959,
34/27,784, 34/27,785; Sept. 7, 1959, 34/28,582;
Oct. 17, 1959, 34/32,859; Dec. 26, 1959, 34/66,857;
Dec. 30, 1959, 35/41,473, 35/41,474, 35/41,475
Int. Cl. B21d 26/12
U.S. Cl. 72—56           16 Claims

ABSTRACT OF THE DISCLOSURE

A system for shaping sheet metal and other plastically deformable bodies overlying a shape-imparting die wherein a shock wave is generated by impulsive spark discharge in a force-transmitting liquid which is in force-transmitting relationship with the body to be shaped via an elastomeric membrane, e.g. forming part of a bladder retaining the liquid; at least one of the electrodes is coated with a dielectric layer of paint, oil, aluminum oxide, etc. prior to immersion in the liquid or is formed of carbon, magnesium, aluminum or other metal with specific gravity less than 5 to augment the shock wave. The electrode may be carried by a spring of low inductivity so as to move by the impulsive force of the spark in a direction tending to increase the gap size; a conductive body not connected to the power supply is disposed between the electrodes.

---

The present application is a continuation-in-part of my copending application Ser. No. 41,080, filed July 6, 1960, now U.S. Pat. No. 3,232,085, issued Feb. 1, 1966.

The present invention relates to apparatus for the shaping of metallic and other plastically deformable bodies using impulsive pressure waves and, more particularly, to a shaping apparatus using shock waves generated by an electric discharge in a liquid medium and transmitted via this medium to a workpiece. An apparatus of this type is described in the above-identified copending application as well as in my subsequently filed applications Ser. No. 104,758 of Apr. 21, 1961 and Ser. No. 329,195 of Dec. 9, 1963, now U.S. Pats. 3,208,254 and 3,232,086 issued Sept. 28, 1965 and Feb. 1, 1966, respectively. As observed in all three of these copending applications, the principle of electric-discharge shaping of metals and the like makes use of a phenomenon more or less recently discovered, namely, the fact that an electric discharge effected between a pair of electrodes in a liquid medium (generally a nonelectrolyte) results in the generation of a shock wave which can be transmitted by the substantially incompressible liquid medium to a workpiece to form the latter against a die or the like. The shock wave apparently develops as a result of a breakdown of the material in the gap between the electrodes with an explosive force such that a rapid molecular movement develops in the region of the discharge, the disturbance being propagated through the liquid medium as a shock wave. It has been observed that the shock wave is of increased amplitude when the spark is relatively "fat" so that efforts in developing apparatus for shaping using electric-discharge pressure have gone into increasing the duration of the discharge by, for example, arranging a plurality of electrode members for successive discharge, by disposing in the region of the discharge a readily fusible material which, upon decomposition, contributed to the kinetic energy of the molecules generating the shock wave, and by retarding leakage currents between the electrodes by the use of a nonelectrolytic liquid, hereinafter referred to as a "dielectric" liquid. It will be understood that this term is used to refer to liquids which are of relatively low conductivity and have high breakdown voltages so that the current surge across the gap has a relatively steep flank (viewing the current-flow characteristic as a function of time); suitable liquids include organic solvents such as kerosene, transformer oil and the like or inorganic (e.g. silicones) liquids of low conductivity.

The present invention relates to further developments of the principles originally set forth in these applications and, especially, to improvements designed to avoid some of the difficulties encountered with electric-discharge apparatus of the prior art. It has been discovered, for example, that the generation of an electric discharge between a pair of electrodes spaced from a plate-like workpiece juxtaposed with a die and in contact with the liquid in which the electrodes are immersed, gives rise to a dispersion of the shock wave so that relatively high discharge energies are required to obtain any shaping of the metal plate at all. In another system, using electric discharges as sound-generating source, the shock wave is transmitted through an elastic diaphragm between different fluids to the sound-receiving source. In this arrangement too, efficient transfer of the discharge energy to the sound-receiving source, spaced from the diaphragm, was rare.

It is thus an important object of the present invention to provide an improved apparatus for using electric-discharge pressure for the shaping of metallic and nonmetallic bodies by shock wave, which extends the principles of my above-identified applications, and especially application Ser. No. 41,080 (U.S. Pat. 3,232,085), of which the present application is a continuation-in-part.

A more specific object of this invention is to provide an improved apparatus for the shaping of bodies by electric-discharge pressure whereby the character of the discharge is improved so that a maximum utilization of the electrical energy used to generate the discharge can be obtained.

Another specific object of this invention is to provide an improved electrode assembly for a discharge-shaping apparatus of the character described which is capable of providing an improved discharge configuration and character, which imparts relatively long life to the electrodes, and which affords a maximum utilization of the discharge current.

Yet a further object of my invention is to provide an apparatus of the character described in which the discharge energy and shock-wave forces are precluded from dissipation and are used with maximum effectiveness for shaping the body.

I have found that the foregoing and other objects of the instant invention can be attained through the use of an apparatus which comprises a generally closed container having at least one flexible wall closely juxtaposed and preferably in contact with the workpiece and filled with a liquid shock-wave-transmitting medium in which the electric discharge is effected. Thus an apparatus fulfilling the requirements of the instant invention will comprise a vessel with at least one wall defined by an elastomeric membrane juxtaposed with and advantageously in surface contact with the workpiece along the surface of the latter opposite a die along which a die cavity is spanned by the workpiece. While the rubber membrane may be clamped against the workpiece by a shell-type vessel open in the direction thereof, I have found that best results are obtained when the vessel itself is constituted by a rubber container or a container of another elastomeric material removably mounted in a rigid shell and receiving the electrodes forming the discharge gap. The liquid serving as the pressure-transmitting medium thus cannot escape from the vessel and difficulties normally involved in sealing a chamber subjected to a rapid succession of high-pressure shock waves is not experienced. In fact, it is another feature of the present invention to provide the elastomeric containers interchangeably within the rigid shell which is open in the direction of the workpiece, the electrodes and their mounting means being advantageously disposed within the vessel. Thus, when a number of discharges have been effected and the pressure-transmitting medium is contaminated with particles of electrode material or is otherwise no longer suitable for discharge, possibly as a consequence of increasing conductivity, the entire rubber vessel can be discarded and replaced by a fresh container with dielectric liquid and even the electrode structure.

According to a more specific feature of the present invention, the discharge generated between the electrodes can be vastly improved, e.g. "fattened" or augmented, so as to develop a greater discharge pressure; thus the interelectrode spacing can be somewhat larger than normally suitable for the generation of the spark discharge when an electrically conductive body is disposed between the electrodes. In this case, the discharge apparently is divided into a pair of somewhat smaller discharges jumping between the intermediate body and the adjacent electrodes at least during the initial portion of the discharge when an ionization of the material in the electrode gap occurs. Thereafter, the conductivity of the gap increases rapidly and the discharge appears to bridge the two eletcrodes in spite of the fact that a conductive member is disposed between them. A single intermediate member can be disposed centrally between the two electrodes, according to the present invention, or else a plurality of equispaced members can be disposed in the gap, as required. The use of intermediate electrodes has been found to sharply increase the discharge pressure available with similar electrical-energy utilization.

I also found that a considerable amount of discharge energy is dissipated or lost by mechanical action upon the electrodes and that this action is in the form of an axial pressure. In fact, the axial pressure applied to the electrodes upon the developments of an arc discharge between the electrodes is transferred to the vessel and thus effectively lost. To avoid this loss, I provide at least one of the electrodes with a resilient discharge element which yields against a slide-restoring force during the discharge. Surprisingly, when the electrode element or the entire electrode structure is resiliently suspended as indicated, the energy available for shaping the workpiece is markedly increased and, apparently, the axial forces applied to the electrode are transformed into useful shock waves for the shaping of the workpiece.

According to still another feature of the present invention, the electrodes forming the discharge gap are composed of different materials with different specific gravities or densities such that the positive discharge electrode has a low specific gravity whereas the negative electrode has a relatively high specific gravity. In fact, it is believed that the increase in discharge pressure resulting from proper association of the electrode polarity with the specific gravity of the electrode material derives from the fact that the positive electrode is generally consumed at a faster rate than the negative electrode. The low specific gravity material, which also is more readily vaporized, thus can be converted into a gas at a higher rate; the increase in volume of the gas contributes to the shock wave both by way of transfer of kinetic energy via molecular collision and by way of expansion to drive the pressure-transmitting medium against the workpiece.

The above and other objects, features and advantages of the present invention will become more readily apparent from the following description, reference being made to the accompanying drawing in which:

FIG. 5 is an axial cross-sectional view through another apparatus for the shaping of workpieces according to this invention;

FIG. 6 is an enlarged detail view of an electrode arrangement suitable for use in the apparatus of FIG. 5;

FIG. 7 is a view similar to FIG. 5 showing still another electrode arrangement;

FIG. 8 is a detail view of the electrode arrangement of FIG. 7; and

FIG. 9 is a view similar to FIG. 5 illustrating another modification of the invention.

Figure 1:
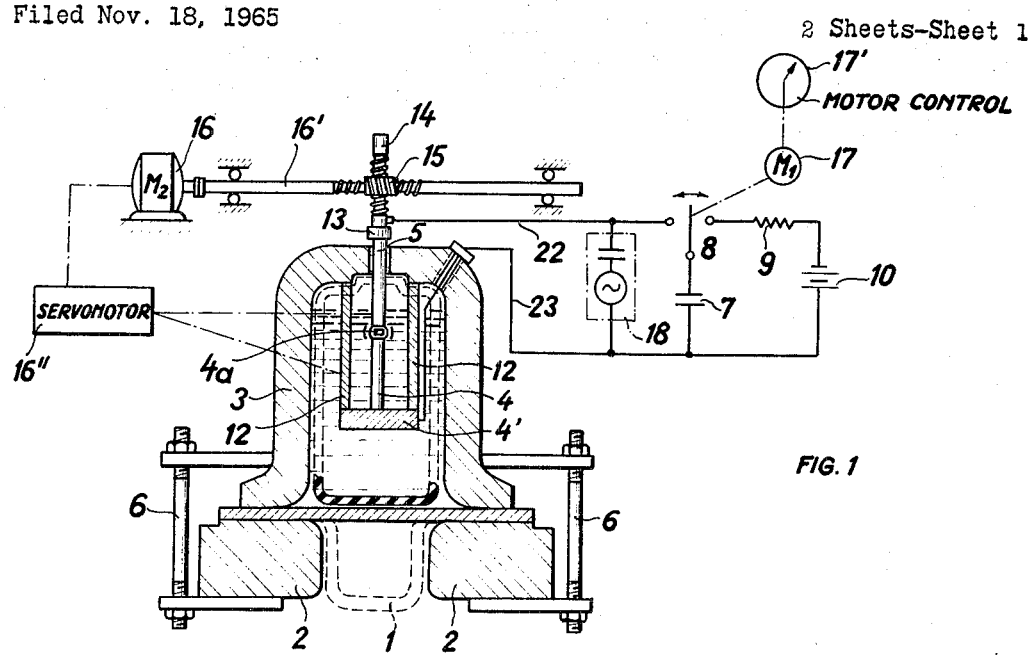
FIG. 1 is an axial cross-sectional view of an electric-discharge shaping apparatus according to the present invention.

In FIG. 1, I show a workpiece 1 mounted upon a support member 2 having a cylindrical bore forming a die cavity. An electric-discharge shell of rigid material forms a vessel 3 clamped to the support 2 via bolts 6, thereby locking the plate-like workpiece in place.

A dielectric liquid is contained within a rubber vessel 11 whose bottom portion lies along the workpiece 1 and forms a rubber membrane thereagainst. The rubber vessel 11 also receives a pair of electrode-holding bars 12 which are suspended from the upper portion of the downwardly concave rigid shell 3 into the electrically insulating liquid within the rubber container. At the lower end of the electrode holders 12, there is disposed a transverse plate 4' upon which the lower electrode 4 is mounted. An upper electrode 5 extends into the chamber through a bore in the upper wall of shell 3 and is spaced from lower electrode 4 to form the discharge gap, an intermediate member 4a being disposed between the electrodes as described subsequently in connection with FIGS. 5 and 6. Electrode 5 is clamped in a chuck 13, the chuck being secured to a threaded bar 14 with which a peripherally toothed nut 15 co-operates. The nut 15 thus constitutes a gear in mesh with a worm spindle 16' driven by a motor 16. A servocontrol device 16", responsive to the mutual spacing of the electrodes 4 and 5, regulates the motor 16, thereby maintaining the discharge gap substantially constant by continuous adjustment of electrode 5 as the juxtaposed portions of the electrodes are eroded by discharge. The discharge electrodes 4 and 5 are connected across the pulsing circuit by conductors 23 and 22, respectively, this circuit including a discharge condenser 7 and a changeoverswitch 8. Condenser 7 is connected to one fixed contact of switch 8 while the other fixed contact of the single-pole, double-throw switch is connected in series with a resistor 9 and a charging battery or other direct-current source 10. The movable contact of switch 8 is connected with the capacitor 7 while the switch armature is drivingly connected to a motor 17 for alternating the switch modes at any desired rate.

Figure 2:
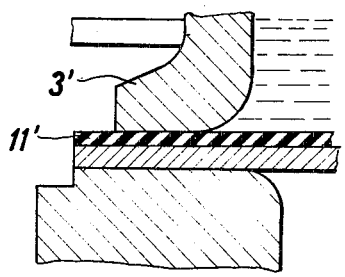
FIG. 2 is a detail view of an apparatus generally similar to that of FIG. 1 but slightly modified according to another feature of the present invention.

When the movable contact is moved to the right (FIG. 1), the condenser is charged and, when the movable contact is shifted to the left, the condenser is discharged across the electrodes 4, 5, thereby generating a spark discharge across the gap. A motor-control device 17' is connected with motor 17 to adjust the rate at which the switch 8 alternates between its charging and its discharging modes. A high-frequency alternating-current source 18 is connected via a DC-blocking capacitor across the electrodes 4, 5 for facilitating the ignition of the discharge across the interelectrode gap. It has been found, as set forth in the aforementioned parent application, that the use of this high-frequency alternating current facilitates the subsequent direct-current discharge. Upon discharge of capacitor 7 across the interelectrode gap, there is an instantaneous expansion of gas between the electrodes and in the region thereof and a generation of a shock wave which is propagated through the liquid and transferred thereby via the membrane 11 to the workpiece 1 to deform the latter in accordance with the configuration of the die as indicated by the broken lines 1'. In general, it may be stated that when the electric discharge of capacitor 7 is relatively small, the spark-discharge energy is correspondingly low and the energy of the pressure pulse transmitted by the liquid to the workpiece is meager. As the frequency or alternation of the switch 8 increases, the capacitor charging time is reduced and pressure pulses of relatively small magnitude are applied to the workpiece. On the other hand, if the switch-over time is relatively large, the capacitor 7 can charge to full capacity and apply relatively large pressure pulses to the workpiece, in some cases it is advantageous, especially for fine work, to use relatively meager pressure pulses and for this purpose, motor control 17' can be a calibrated tachometer presettable to yield the desired machining quality. In the arrangement of FIG. 2, the rubber vessel 11 is not employed and a membrane 11' is sealingly clamped between the rigid vessel 3' and the workpiece 1.

Upon discharge across the electrodes 4, 5 and/or between these electrodes and intermediate conductive body 4a, whose purpose will be described in greater detail hereinafter, the insulating liquid in the discharge gap is instantaneously and explosively driven outwardly and partially converted to gas. The gas, thus occluded in the insulating liquid rapidly expands at the high temperature caused by the electric-spark discharge while the instantaneous magnetic field apparently accelerates simultaneously formed ions to produce the pressure wave. The pressure wave, radiating in all directions around the gap, is transmitted to the insulating liquid and applies an impulsive pressure to the walls of the shell 3 and the receptacle 11. Since the shell is relatively rigid as indicated earlier, there is no permanent deformation thereof and deformation stress is applied to the workpiece via the membrane 11 juxtaposed therewith to deform the workpiece to its dot-dash position shown at 1', in accordance with the contours of the die 2. This system applies pressure over the entire workpiece surface juxtaposed with the membrane exposed to the pressure-wave-transmitting medium and the effective pressure is thus the shock-wave component normal to the workpiece surface. Electric-discharge pressure thus replaces the hydraulic or pneumatic press system hitherto required for the deep drawing of plate-like metallic bodies and like plastically deformable materials.

Figure 3:
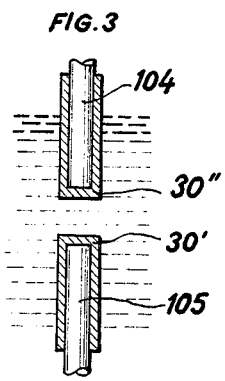
FIG. 3 is an axial cross-sectional view through a pair of electrodes in the region of the spark gap.

From FIG. 1, it can be seen that the shell 3 is concave in the direction of the workpiece and, according to the invention, the concavity is generally paraboloidal as described in the above-identified copending applications, with the discharge gap disposed in the region of the focus of the paraboloid. The workpiece and membrane thus lie along planes perpendicular to the paraboloid axis and receive reflected shock waves propagated in a direction general perpendicular to this plane. It may be noted that the present invention also contemplates the use of an electrolyzable liquid decomposable into a combustible or ignitable gas mixture. When, for example, water is employed together with an additive to increase the conductivity of the liquid, each discharge can be preceded by a short electrolysis period in which hydrogen or oxygen are generated by the application of uninterrupted direct current across the electrodes. When this electrolysis period is followed by a spark discharge, e.g. by discharging a capacitor across the electrodes, the gas mixture is ignited and the explosive force of this ignition supplements the discharge shock wave produced as previously described. In most cases, however, it is desirable to eliminate any leakages between the electrodes by the use of insulating liquids of the character described. This permits a high voltage to be applied to the electrodes when the latter are at a fixed spacing. It is, however, an important feature of the present invention to provide the electrodes with a coating of a material having a high dielectric constant and thereby increase the resistance at the electrode/liquid interface. It will be understood that the interelectrode resistence is the sum of the liquid resistance across the gap and the interfacial resistances adjacent the electrodes so that a substantial increase of the latter values will increase the overall interelectrode resistance. When, for example, the electrodes are composed of aluminum or other light metal, they can be provided with aluminum-oxide layers of elevated resistance although nonconductive or limitedly conductive paints or other coating material may be employed. In FIG. 3, for example I show the electrodes 104 and 105 to be provided with resistive coatings 30' and 30" in their juxtaposed region, these coatings being of relatively thin dielectric material which is ruptured or destroyed by the initial discharge. When, for example, the liquid is less conductive than oil (e.g. as is the case with water), the dielectric coating may be an oil layer applied to the electrodes prior to their immersion in the pressure-transmitting liquid.

Figure 4:
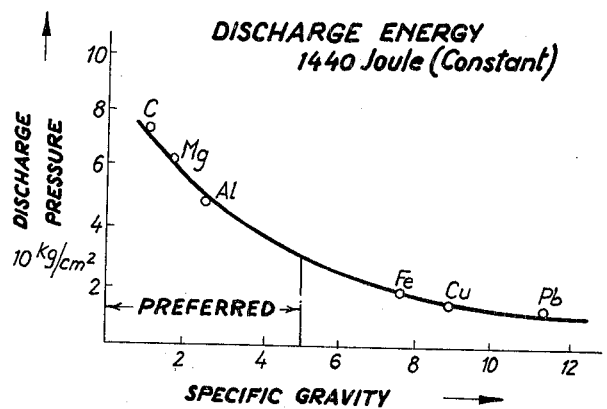
FIG. 4 is a graph illustrating the principles of the present invention.

As previously observed, when different electrode materials are tested with discharge condensers of the same capacity, with identical charging voltages, times and similar insulating liquids, the impulsive pressure produced by the discharge (i.e. the discharge pressure) is found to be substantially inversely proportional to the specific gravity of the electrode material used, when the same material is employed for both electrodes. Thus, when the specific gravity of the electrode material is relatively large, the discharge pressure in terms of the liquid pressure applied to the workpiece is relatively small, whereas a large discharge pressure results when the specific gravity of the electrode material is low. These results can be seen from FIG. 4 in which the specific gravity of the electrode material is shown along the abscissa while the discharge pressure in terms of tens of kgs. per cm.$^2$ is plotted as the ordinate. When copper (Cu) was used as the electrode material, the discharge pressure was approximately 120 kg. per cm.$^2$, whereas aluminum gave a pressure of approximately four times this value. The discharge energy applied in both cases was 1440 joules; the ratio of the specific gravity of aluminum to that of copper is about 3.3, while the discharge pressure is about 4 times as large for the aluminum.

The reason why the discharge pressure increases when a material of low specific gravity is used is not apparent. However, the following may be considered: The vaporization of different electrode materials under the same discharge energy yields a large volume in the case of a material of low specific gravity; furthermore, the particles of discharge electrodes dispersed in the liquid by the discharge will increase the gasification rates of the insulating liquid and the rate of expansion of the gas thus formed. Namely, a large quantity of powder of the electrode material dispersed in the liquid is considered to act effectively in the heating of liquid around the discharge point without being limited to the local discharge point. The electrode materials are not limited to the light metals as plotted in FIG. 4, such as aluminum (Al), magnesium (Mg), etc. Even conductive nonmetals such as carbon (C) may be used satisfactorily when they are of low specific gravity. Even alloys can be used satisfactorily, when they satisfy the abovementioned condition. Best results are obtainable when the specific gravity of the material does not exceed 5. The above explanation, while based on the magnitude of specific gravity, is also pertinent with respect to the atomic weight which is in similar relation to the specific gravity as well as with respect to the specific heat which has an inverse relationship thereto. Though it is not yet certain, the fusion point, boiling point, hardness, and various other factors such as an amount of consumption due to the same discharge energy as referred to above are considered to have a relation to the discharge pressure generated. It is difficult to discuss the above generally. The material of the machining electrodes is not necessarily the same for both the positive and the negative poles and a combination of different electrode materials may be also satisfactorily used; it will be seen that by using an electrode of a low specific gravity in only one pole, the discharge pressure may be doubled.

FIG. 5 illustrates apparatus adapted to increase the discharge pressure by utilizing the vaporization and dispersion of discharge electrodes, wherein the discharge pressure is further augmented by arranging an intermediate electrode (as in FIG. 1) between said discharge electrodes. An intermediate electrode 80 is positioned midway between the electrodes 70 and 71 for the discharge electrodes 4 and 5. One or two intermediate electrode or electrodes of sheet material can be arranged in the middle of the discharge gap between electrodes 70 and 71 by suitable means.

By such an arrangement, a part of the electrode material of electrodes 70 and 71 is vaporized by high temperature generated in the course of electro discharge, thereby the gas occluded in the insulating liquid or gases generated by the gasification of the insulating liquid itself are rapidly expanded together; as previously described, with respect to FIG. 6, a strong discharge pressure is then produced. In this apparatus, the discharge pressure is further increased by the vaporization of intermediate electrode 80 or 80, 80' together with the electrodes 70, 71, and moreover, in this case, a so-called discharge clearance is subdivided into two or three clearances, and the above-mentioned increase of discharge pressure will also be thereby influenced. Examples of experiment with the apparatus equipped with such intermediate electrodes are shown in the following table. As is apparent from said table, the discharge pressure can be approximately doubled.

| Experiment | (a) One Intermed. Electrode | (b) Two Intermed. Electrode | (c) No. Intermed. Electrode |
|---|---|---|---|
| Electrode used | Fe—Fe | Fe—Fe | Fe—Fe |
| Intermed. electrode | Cu | Cu | |
| Intermed. electrode thickness (mm.) | 0.2 | 0.2 | |
| Discharge condenser capacity ($\mu f.$) | 7,000 | 7,000 | 7,000 |
| Charging voltage (v.) | 700 | 700 | 700 |
| Charging energy (joules) | 1,700 | 1,700 | 1,700 |
| Discharge pressure (kg./cm.$^2$) | 500 | 500 | 260 |

In the above case, the discharge pressure was the same in the Examples (a) and (b) and is considered to be a consequence of distance between the intermediate electrode materials or the distance between the latter and the electrodes. FIGS. 7 and 8 show apparatus in which useless consumption of discharge pressure due to strong axial pressure imposed on the electrodes themselves at the instant of electric discharge is intended to be prevented. Here the discharge clearance is a source of discharge pressure and, moreover, as this clearance is extremely narrow, the discharge pressure produced in the form of impulsive waves acts upon the electrode oppositely located at the clearance and useful discharge pressure normally exerted on the workpieces is considered to be dissipated.

In this apparatus, the discharge electrodes 70 and 71 are held elastically by supports 204 and 205 by means of springs 90 and 90' as evident from FIG. 8.

By so doing, when electric discharge is effected in the discharge clearance, the electrodes are prevented from having imposed thereon axially strong pressure by the discharge. In the previous apparatus described, the discharge electrodes receive an axial force at the instant of electric discharge, said force being converted to an impulsive force against discharge vessel 103 which is lost energy. It is one of the characteristics of the apparatus shown in FIG. 7 that the discharge pressure is intended to be increased by keeping said impulsive force against discharge-electrode holding 204 and 205 to a minimum.

By means of elastically secured electrodes 70' and 71' the impulsive force produced at the discharge clearance is sharply reduced, and the electrode materials 70 and 71 will disappear simultaneously with the electric discharge at said clearance, with the result that almost all the discharge pressure is efficiently transmitted to the workpiece. As compared with that shown in FIG. 8 having an intermediate electrode inserted, the discharge pressure is further increased. The experiment showed that with a discharge condenser of 7000 $\mu f.$ and a charging voltage of 700 v., the discharge pressure rose to 560 kg./cm.$^2$. (During this experiment, springs 90 and 90' were broken at the instant of electric discharge, and a discharge pressure of 480 kg./cm.$^2$ was obtained. The residual voltage of condenser 7 was 230 v. Thus, as the discharge energy released was 1515 joules, by considering it in terms of a discharge energy of 1700 joules, the value of discharge pressure of 560 kg./cm.$^2$ was calculated.)

This discharge pressure has a pressure increment of about 60 kg./cm.$^2$ as compared with that in the apparatus of FIG. 6, showing that the impulsive pressure imposed on the discharge electrodes in FIG. 7 can be utilized as a liquid pressure in the apparatus of FIG. 7. And as is evident from this experiment, in order to use discharge energy perfectly, the springs 90 and 90' are preferably made of unbreakable material, and even if they are broken, a discharge pressure substantially comparable to a discharge pressure of 500 kg./cm.$^2$ in the apparatus of FIG. 7 is obtainable and sufficiently usable for the present purpose.

In this case, precautions should be taken not to impart any inductance to springs 90 and 90' which are in the discharge circuit, because materially 70' and 71' sustain the discharge. If any inductance is present, the rise of electric discharge energy is impeded and no instantaneous spark discharge can be expected and the discharge pressure can not be used as an efficient impulsive source.

As a result of the investigation on the relation between the discharge-electrode materials 70 and 71 and the polarity of discharge, the following facts have been confirmed. Namely, if the different electrode materials are used respectively for positive and negative electrodes, the discharge pressure obtained in the case when the electrode material of low specific gravity is used for the positive discharge electrode and the material of high specific gravity is used for the negative electrode is about double as compared with the reverse case. This means that the discharge polarity can not be neglected. The results of the experiments are shown in the following table:

| Electrode material | Polarity | Condenser capacity ($\mu f.$) | Charge voltage (v.) | Discharge energy (joules) | Disch. pressure (kg./cm.$^2$) |
|---|---|---|---|---|---|
| Experiment 1 Al/Pb | +/− | 7,000 | 700 | 1,700 | 620 |
| Experiment 2 Al/Pb | −/+ | +7,000 | 700 | 1,700 | 330 |

The reason why high discharge pressure can be obtained by choosing a low specific gravity electrode material for the positive pole and a high specific-gravity material for the negative pole can be explained simply as follows: In ordinary discharge-machining apparatus, the positive electrode is generally consumed faster than the negative electrode. On the other hand, as apparent from the foregoing discussion, the electrode material of low specific gravity is easily vaporized in large quantity at the instant of electric discharge. From these facts, it is presumable that the greater vaporization of low-specific-gravity electrode material on the positive side contributes to an increase of effective discharge pressure.

The preceding table indicates the use of both Al and Pb. However, the use of low-specific-gravity electrode materials for both electrodes may be effective to obtain still larger discharge pressures.

In FIGS. 5 and 7, the electrode materials 70, 71 and 70', 71' are carried by conductive holders 204, 205 slidably mounted in bushings 21, 21 in housing 103. The dies 102 on opposite sides of the gap are provided with die cavities 50 overlain by the workpieces 101, 101'. Rubber membranes 111, 111' enclose the chamber containing the liquid and overlie the workpiece.

With the apparatus shown in FIG. 9 it is possible, according to a more specific feature of this invention, to obtain an increased discharge energy by eliminating the losses usually deriving from the use of switching means to cause the discharge of the capacitor across the electrode gap. In this arrangement, the sheet-metal workpieces 301 disposed on opposite sides of the electrodes 304 and 305 are held against the respective dies 302 with the respective die cavities 350 being open in the direction of the workpieces 301. As previously described, rubber membranes 311 are disposed between workpieces and the liquid within the discharge chamber which is defined by the horizontal walls 303 and the vertical walls 303'.

The discharge electrodes 304 and 305 extend centrally into the interior of the discharge vessel 303, 303' which is filled with the insulating liquid. Electrodes 304 and 305 are connected with a discharge condenser 7, a switch 8' for charging the condenser 7, a charging resistance 9 and a direct-current source 10 of electric current, as described with respect to the earlier embodiments. In this system, however, the electrode 304 is fixed in the housing while electrode 305 is axially shiftable in the direction of the stationary electrode 304 by a rack-and-pinion mechanism 315 at its lower portion. An electric servo-motor 316 is coupled via the shaft 316' with the pinion and is controlled by a conventional servo-regulation system 316" connected across the electrodes 304, 305 for sensing the discharge gap. The servomotor 316 is reversible for raising and lowering the electrode 305, thereby decreasing and increasing the discharge gap respectively. Inasmuch as it is the electric-discharge energy which is converted into the liquid pressure for shaping the workpieces, an increase of the electric-discharge energy is necessary to effect an increase in the shaping energy. Thus, for a discharge condenser 7 of a particular capacitance, an increase in the available discharge energy requires a corresponding increase in the voltage developed across the condenser prior to the discharge. More specifically, it can be seen that the electric energy stored in the capacitor is directly proportional to the square of the charging voltage which, in turn, is limited by the break potential of the discharge network in which the capacitor is connected. When, with respect to the breakdown potential of this network, the voltage across the condenser becomes excessive, a leakage between the electrodes will develop to detract from the available machining energy. Accordingly, an insulating liquid having a high leakage resistance is needed. When a mechanical switch is employed in the discharge circuit between one of the electrodes and the condenser 7, undesirable discharges have a tendency to develop at the switch at the instant of switch closure to produce a spark whose energy is lost from the point of view of the shaping operation. Furthermore, this spurious discharge wears out the contacts of the switch and prevents ordinary switches from being used.

Furthermore, any leakage current passing between the electrodes results in an increase in the temperature of the insulating liquid in the region of the discharge gap whereby gases produced by the heating effect or entrapped in the liquid tend to expand gradually, thereby decreasing the rate of pressure increase and thus the instantaneous discharge pressure. By way of example, it may be noted that the leakage currents have their equivalent in arc discharges which have empirically been found to be far less effective for the shaping operation than have the spark discharges with which the present invention is concerned because of the slower rate of change of pressure with continuous current drains across the gap.

I have found that the available spark energy, with a given value of electrical discharge capacitance can be increased substantially when during storage of electrical energy in the capacitor, the electrodes are spread apart and, when the stored energy has attained a predetermined level, the electrodes are displaced relatively to narrow the gap until a predetermined minimum gap distance is attained at which discharge occurs. No other mechanical switch or like component is required in series with the discharge capacitor. Thus, the electrode 305 is permitted to descend by the motor 316 under control of the sensing device and regulator 316" as long as the capacitor 7 is charging (switch 8' being closed). When the charging of condenser 7 is completed, the motor 316 is reversed and the gap narrowed to provide a rapid discharge across the gap when the minimum spacing is obtained. It will be understood that electrode 304 can likewise be provided with a motor for reciprocating same toward and away from the electrode 305 or a common motor can be provided for both electrodes. The servoregulator has, moreover, the advantage that the minimum and maximum gaps can be maintained with great precision thereby effectively feeding the electrode 305, in addition to the reciprocation thereof, in accordance with the wear of the electrodes.

The invention described and illustrated is believed to admit of many modifications within the ability of persons skilled in the art, all such modifications being considered within the spirit and scope of the appended claims.

I claim:
1. In an apparatus for the shaping of plastically deformable bodies with liquid-transmitted shock waves, in combination,
   a substantially closed liquid-containing vessel having at least one flexible wall juxtaposed with a body to be shaped and disposed between the liquid of said vessel and said body, said flexible wall being in contact with said liquid and overlying said body in contact therewith;
   a pair of electrodes disposed within said vessel and immersed in said liquid for sustaining impulsive electric discharge between said electrodes;
   a shape-imparting member, said body being disposed between said shape-imparting member and said wall;
   power-supply means connected across said electrodes for applying thereto an electric-current pulse sufficient to cause an impulsive discharge across said electrodes and generate a shock wave transmittable by said liquid and said flexible wall to said body; and
   at least one intermediate conductive body not connected in circuit with said power-supply means but disposed between said electrodes in spaced relationship therewith.

2. The combination defined in claim 1 wherein said body is generally flat and said flexible wall includes an elastomeric membrane overlying said body in contact therewith.

3. The combination defined in claim 1 wherein said vessel includes a rigid shell open in the direction of said body, and a liquid-containing receptacle of elastomeric material forming said wall and receiving within said shell while receiving said liquid and said electrodes.

4. The combination defined in claim 1 further comprising support means in said receptacle for at least one of said electrodes and resilient means interconnecting said one of said electrodes with said support means within said vessel.

5. In an apparatus for the shaping of plastically deformable bodies with liquid-transmitted shock waves, in combination,
a liquid-containing vessel having at least one flexible wall juxtaposed with a body to be shaped and disposed between the liquid of said vessel and said body; a pair of electrodes disposed within said vessel and immersed in said liquid for sustaining impulsive electric discharge between said electrodes;
power-supply means connected across said electrodes for applying thereto an electric-current pulse sufficient to cause an impulsive discharge across said electrodes and generate a shock wave transmittable by said liquid and said flexible wall to said body; and
support means in said receptacle for at least one of said electrodes and resilient means interconnecting said one of said electrodes with said support means within said vessel, said support means comprising a pair of electrode holders and said resilient means including a pair of springs with negligible inductivity disposed respectively between each electrode and the respective holders.

6. The combination defined in claim 1 wherein at least one of said electrodes is provided prior to immersion in said liquid with a coating of a material having a higher dielectric constant than said liquid.

7. The combination defined in claim 1 wherein at least one of said electrodes is composed at least in part of a conductive material having a specific gravity less than about 5.

8. The combination defined in claim 8 wherein said power-supply means includes a capacitor connected across said electrodes, direct-current charging means for charging said capacitor, each of said electrodes being associated with a respective direct-current polarity, said one of said electrodes being of positive polarity.

9. The combination defined in claim 8 wherein both of said electrodes are composed of conductive material having a specific gravity less than about 5.

10. The combination defined in claim 9 wherein said electrode material contains carbon, magnesium or aluminum.

11. The combination defined in claim 1 wherein said power-supply means includes a discharge capacitor connectable across said electrodes, charging means connectable with said capacitor for charging same, variable-operating-rate switch means between said capacitor, said charging means and said electrodes for alternately connecting said capacitor with said charging means and with said electrodes, and machining-control means connected with said switch means for selectively varying the rate of alternation of said switch means in accordance with the desired intensity of the shock waves to be applied to said body.

12. In an apparatus for the shaping of plastically deformable bodies with liquid-transmitted shock waves, in combination,
a liquid-containing vessel juxtaposed with said body and containing liquid in force-transmitting relationship with said body;
support means within said vessel;
a pair of spaced-apart electrodes resiliently mounted upon said support means and immersed in said liquid for sustaining impulsive electric discharge between said electrodes;
power-supply means connected across said electrodes for applying thereto an electric-current pulse sufficient to cause an impulsive discharge across said electrodes and generate a shock wave transmittable by said liquid to said body; said support means including a pair of electrode holders; and a pair of springs of negligible inductivity each connecting one of said electrodes with a respective one of said holders.

13. In an apparatus for the shaping of plastically deformable bodies with liquid-transmitted shock waves, in combination,
a liquid-containing vessel having liquid in force-transmitting relationship with a body to be shaped;
a pair of spaced-apart electrodes disposed within said vessel and immersed in said liquid for sustaining impulsive electric discharge between said electrodes;
power-supply means connected across said electrodes for applying thereto an electric-current pulse sufficient to cause an impulsive discharge across said electrodes and generate a shock wave transmittable by said liquid to said body; and
at least one intermediate conductive body not connected to said power-supply means disposed between said electrodes with clearance from them.

14. In a method of operating an apparatus for the shaping of plastically deformable bodies by liquid-transmitted shock waves, wherein an impulsive electric discharge is effected between a pair of electrodes immersed in a liquid in force-transmitting relationship with a body to be shaped upon the discharge of a capacitor across said electrodes, the improvement which comprises the steps of:
(a) relatively displacing said electrodes to increase the gap therebetween with charging of said capacitor, thereby restricting the formation of leakage currents between said electrodes tending to dissipate the charge stored in said capacitor; and
(b) relatively displacing said electrodes to reduce said gap upon charging of said capacitor to effect the impulsive electric discharge between said electrodes in said liquid.

15. In an apparatus for the shaping of plastically deformable bodies with liquid-transmitted shock waves, in combination, a liquid-containing vessel having liquid in force-transmitting relationship with a body to be shaped; a pair of spaced-apart electrodes disposed within said vessel and immersed in said liquid for generating between them an impulsive electric discharge through said liquid, thereby producing a shock wave transmittable by said liquid to said body; a discharge capacitor connected across said electrodes; a source of direct current connectable across said capacitor for charging same; and discharge control means connected with at least one of said electrodes for relatively displacing said electrodes to increase the gap between them for charging of said capacitor by said source while restricting the flow of leakage currents between said electrodes, and for relatively displacing said electrodes to decrease said gap upon the charging of said capacitor to a point at which said impulsive discharge develops across said electrodes.

16. In a method of operating an apparatus for the shaping of plastically deformable bodies by liquid-transmitted shock waves, wherein an impulsive electric discharge is effected between a pair of electrodes immersed in a dielectric liquid in force-transmitting relationship with a body to be shaped upon the discharge of a capacitor across said electrodes, the improvement which comprises the steps, in combination, of:
(a) disposing said electrodes in relatively widely spaced-apart relationship with one another in said liquid;
(b) charging said capacitor to a predetermined voltage while maintaining the spatial relationship of the electrodes established in step (a); and
(c) advancing at least one of said electrodes, upon the charging of the capacitor in step (b), toward the other of said electrodes to reduce the gap therebetween and effect an impulsive electric discharge through said liquid at the instant the gap between said electrodes is narrowed to the point that breakdown of the gap is possible at the voltage applied by the capacitor across the electrodes.

References Cited

UNITED STATES PATENTS

| | | | |
|---|---|---|---|
| 781,619 | 1/1905 | Rogers | 72—56 |
| 921,013 | 5/1909 | Shoemaker | 340—12 |
| 1,337,046 | 4/1920 | Coyle | 313—126 |
| 2,559,227 | 7/1951 | Rieber | 72—56 |
| 2,887,604 | 5/1959 | Bodine et al. | 340—12 |
| 3,007,133 | 10/1961 | Padberg | 72—56 |
| 3,163,141 | 12/1964 | Wesley et al. | 72—56 |
| 3,181,328 | 5/1965 | Zeitlin | 72—56 |
| 3,371,404 | 3/1968 | Lemelson | 29—421 |

OTHER REFERENCES

"Explosives From Space Age Shapes," Steel, August 1958, pp. 82–86.

RICHARD J. HERBST, Primary Examiner

U.S. Cl. X.R.

29—421; 340—12